(No Model.)
W. L. JOLLY.
PNEUMATIC TIRE.
No. 603,276.  Patented May 3, 1898.
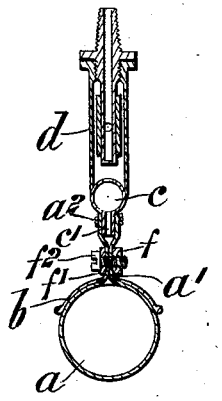
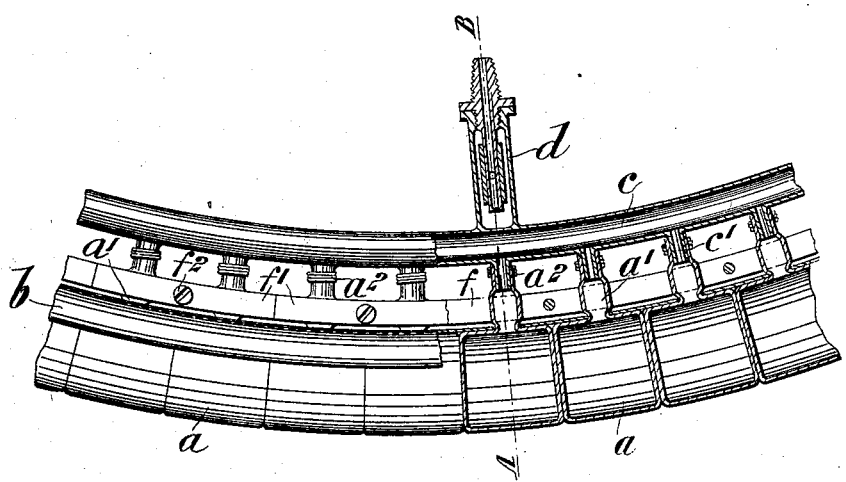

UNITED STATES PATENT OFFICE.

WILLIAM L. JOLLY, OF ARROWTOWN, NEW ZEALAND.

PNEUMATIC TIRE.

SPECIFICATION forming part of Letters Patent No. 603,276, dated May 3, 1898.

Application filed January 22, 1898. Serial No. 667,606. (No model.)

*To all whom it may concern:*

Be it known that I, WILLIAM LACHLAND JOLLY, a British subject, and a resident of Arrowflat, Arrowtown, in Otago, in the Colony of New Zealand, have invented Improvements in Pneumatic Tires, of which the following is a specification.

This invention relates to pneumatic tires of vehicles, and has for its object to provide a tire which may be easily repaired or parts replaced without deflating the whole tire.

The invention consists in arranging small bags around the periphery of the wheel-rim to form a continuous tire, and the necks of such bags pass through the said rim and are connected to nozzles arranged around an air-tube concentric with the rim. The bags are filled simultaneously from the air-tube by means of the usual hand-pump, and the necks of the bags are then closed by clamps. In case of puncture any single bag may be replaced and the new bag inflated without disturbing all the others. A rider of a bicycle can thus carry a supply of small bags and in case of accident can remedy the damage in a few minutes.

In order that my invention may be more easily understood, reference will be made to the accompanying drawings, on which—

Figure 1 is a side view of a portion of the tire, partly in section. Fig. 2 is a cross-section on line A B, Fig. 1.

Similar letters refer to similar parts.

Upon the drawings the bags $a$ are made of india-rubber or india-rubber and canvas or other suitable flexible material which will stand considerable internal pressure and are arranged around the rim $b$ of the wheel of the vehicle, with their necks $a'$ passing through the said rim. The air-tube $c$ is made concentric with the rim of the wheel and has nozzles $c'$, to which the necks $a'$ are hermetically secured, preferably by means of wire or twine $a^2$. Air is admitted through any ordinary non-return nozzle $d$ and forced into the air-tube $c$ by means of an ordinary air-pump. When the required pressure is attained, the necks $a'$ are gripped in clamps, which consist of a continuous ring $f$, placed in one side of the necks, and short sections $f'$, screwed thereto by screws $f^2$ on the other side. When the screws $f^2$ are screwed up tightly, the necks will be closed and the air prevented from escaping and the pressure maintained in the bags.

In case of puncture the section $f'$ holding the punctured bag is removed, the bag replaced by a new one and inflated by applying the air-pump, and the section returned to its position and screwed up. Thus a bag may be removed and a new one substituted without disturbing all the bags in a tire.

It is obvious that my bags and clamps may be used for other purposes—such as padding for horse-collars, saddles, and the like.

What I claim, and desire to secure by Letters Patent of the United States, is—

In combination, the rim, the plurality of independent inflatable sections having necks extending through the rim, the continuous air-tube located inside the rim and having nozzles corresponding to said necks and designed to be detachably connected therewith, the single plate extending in line with all of the necks on one side, the plurality of independent plates located on the opposite side, and screws for securing the independent plates of the continuous plate and thereby clamping the necks, substantially as described.

In testimony whereof I have signed this specification in the presence of two subscribing witnesses.

WILLIAM L. JOLLY.

Witnesses:
A. J. PARK,
J. R. PARK.